(12) United States Patent
Woodberg et al.

(10) Patent No.: US 10,171,423 B1
(45) Date of Patent: Jan. 1, 2019

(54) SERVICES OFFLOADING FOR APPLICATION LAYER SERVICES

(71) Applicant: Juniper Networks, Inc., Sunnyvale, CA (US)

(72) Inventors: Bradley S. Woodberg, Plymouth, MI (US); Venkata Rama Raju Manthena, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 260 days.

(21) Appl. No.: 14/718,481

(22) Filed: May 21, 2015

(51) Int. Cl.
*H04L 29/02* (2006.01)
*H04L 29/06* (2006.01)
*G06F 12/14* (2006.01)

(52) U.S. Cl.
CPC ...... *H04L 63/0254* (2013.01); *H04L 63/1408* (2013.01)

(58) Field of Classification Search
CPC . H04L 63/1408; H04L 63/0254; H04L 63/02; H04L 63/0281; H04L 47/12; H04L 47/122; H04L 47/125; G06F 2209/509
USPC .......................................... 726/11–14, 22–25
See application file for complete search history.

(56) References Cited

U.S. PATENT DOCUMENTS

| | | | |
|---|---|---|---|
| 7,616,563 B1 | 11/2009 | Eiriksson et al. | |
| 7,644,150 B1 * | 1/2010 | Nucci | H04L 41/0893 706/12 |
| 8,503,438 B2 * | 8/2013 | Lim | H04L 45/22 370/328 |
| 8,606,847 B2 * | 12/2013 | Raghunath | H04L 45/00 709/203 |
| 8,743,690 B1 * | 6/2014 | Janarthanan | H04L 47/31 370/235 |
| 2004/0117614 A1 * | 6/2004 | Minnick | H04L 63/0428 713/153 |
| 2005/0183140 A1 | 8/2005 | Goddard | |
| 2006/0179296 A1 * | 8/2006 | Bartlett | H04L 63/0218 713/152 |
| 2008/0016511 A1 * | 1/2008 | Hyder | G06F 9/5027 718/105 |
| 2010/0071024 A1 * | 3/2010 | Eyada | H04L 63/0263 726/1 |
| 2011/0075675 A1 * | 3/2011 | Koodli | H04L 12/14 370/401 |
| 2011/0302308 A1 * | 12/2011 | Prodan | G06Q 20/10 709/225 |

(Continued)

OTHER PUBLICATIONS

Konstantinos Samdanis et al., Traffic Offload Enhancements for eUTRAN, IEEE (Year: 2012).*

*Primary Examiner* — Shanto Abedin
(74) *Attorney, Agent, or Firm* — Harrity & Harrity, LLP (57) ABSTRACT

A device may receive a set of packets. The device may select a first one or more packets, of the set of packets, for a Layer 7 (L-7) inspection based on a type of network traffic associated with the set of packets. The device may perform the L-7 inspection on the first one or more packets. The device may determine contextual information associated with the first one or more packets based on the L-7 inspection. The device may offload a second one or more packets, of the set of packets, for a Layer 4 (L-4) inspection without performing the L-7 inspection based on the contextual information associated with the first one or more packets.

20 Claims, 9 Drawing Sheets

(56) References Cited

U.S. PATENT DOCUMENTS

2015/0019702 A1* 1/2015 Kancherla ............. H04L 47/125
709/223
2016/0191558 A1* 6/2016 Davison ................ H04L 63/145
713/171

* cited by examiner

SERVICES OFFLOADING FOR APPLICATION LAYER SERVICES

BACKGROUND

One or more functions of a network device may be described according to the Open Systems Interconnection (OSI) model, which divides the one or more functions into seven hierarchical layers. Layer 7 (L-7) (e.g., the application layer) of the OSI model may be associated with a set of network services performed on application traffic, such as classifying applications, protocol inspection, application transaction analysis, reporting, applying policies to identify and prevent a security issue associated with an application vulnerability and/or an associated communications protocol, or the like. Layer 3 (L-3) (e.g., the network layer) and Layer 4 (L-4) (e.g., the transport layer) of the OSI model may be associated with another set of network services performed on network traffic.

SUMMARY

According to some possible implementations, a device may include one or more processors. The one or more processors may receive a set of packets. The one or more processors may select a first one or more packets, of the set of packets, for a Layer 7 (L-7) inspection based on a type of network traffic associated with the set of packets. The one or more processors may perform the L-7 inspection on the first one or more packets. The one or more processors may determine contextual information associated with the first one or more packets based on the L-7 inspection. The one or more processors may offload a second one or more packets, of the set of packets, for a Layer 4 (L-4) inspection without performing the L-7 inspection based on the contextual information associated with the first one or more packets.

According to some possible implementations, a method may include receiving, by a device, network traffic. The method may include identifying, by the device, a first portion of the network traffic for an application layer inspection. The method may include performing, by the device, the application layer inspection on the first portion of the network traffic based on identifying the first portion of the network traffic. The method may include selectively offloading, by the device, a second portion of the network traffic for transport layer inspection without the application layer inspection based on performing the application layer inspection on the first portion of the network traffic.

According to some possible implementations, a computer-readable medium may include one or more instructions that, when executed by one or more processors, may cause the one or more processors to perform a lower layer inspection on a first portion of network traffic. The one or more instructions, when executed by the one or more processors, may cause the one or more processors to cause an upper layer inspection to be performed on the first portion of the network traffic based on the lower layer inspection on the first portion of the network traffic. The upper layer may be higher relative to the lower layer in an Open Systems Interconnection (OSI) model. The one or more instructions, when executed by the one or more processors, may cause the one or more processors to determine a trigger regarding network traffic that is to be provided offloaded from upper layer inspection based on the upper layer inspection. The one or more instructions, when executed by the one or more processors, may cause the one or more processors to perform another lower layer inspection on a second portion the network traffic. The other lower layer inspection indicating that the trigger is not satisfied. The one or more instructions, when executed by the one or more processors, may cause the one or more processors to provide the second portion of the network traffic toward a destination without performing another upper layer inspection based on the trigger not being satisfied.

DETAILED DESCRIPTION

The following detailed description of example implementations refers to the accompanying drawings. The same reference numbers in different drawings may identify the same or similar elements.

A network device may perform a set of network services on network traffic, such as inspection services, classification services, reporting services, or the like. Based on analyzing the network traffic, the network device may apply a network policy, prevent access to a network, determine whether a security issue is included in the network traffic, or the like. The network device may perform the set of network services at the application layer of network traffic (e.g., Layer 7 (L-7) of the Open Systems Interconnection (OSI) model) using an application layer services module. An application layer services module may refer to a module of the network device configured to perform L-7 network services, such as a module implemented in hardware, firmware, software executing on hardware, or a combination of multiple different and/or similar modules. L-7 network services may be computationally intensive and utilization of L-7 inspection (e.g., an application layer inspection) may result in reduced network throughput relative to an OSI Layer 4 (L-4) inspection (e.g., a transport layer inspection).

For a session of network traffic, utilization of the application layer services module may necessitate anchoring the session to the application layer services module for the entirety of the session. However, for network traffic of a particular data size satisfying a threshold, such as streaming video, database backups, or the like, anchoring the session to the application layer services module for the entirety of the session may result in unsatisfactory network performance. Moreover, such a configuration may scale poorly and performance bottlenecks may occur as a result of packets being processed in a serial manner by the application layer services module to maintain consistent state management during the session. Implementations, described herein, may facilitate selective network traffic offloading from an upper layer (e.g., L-7) module to a lower layer (e.g., L-4) module based on a network traffic transaction and/or contextual information associated therewith. In this way, network performance may be increased, relative to L-7 inspection without selective network traffic offloading, based on increased throughput and/or decreased latency.

Although described herein in terms of an L-7 layer and an L-4 layer, implementations, described herein, may also refer to other layers, such as an L-6 layer, and L-5 layer, an L-3 layer, an L-2 layer, and/or an L-1 layer.

Figure 1:
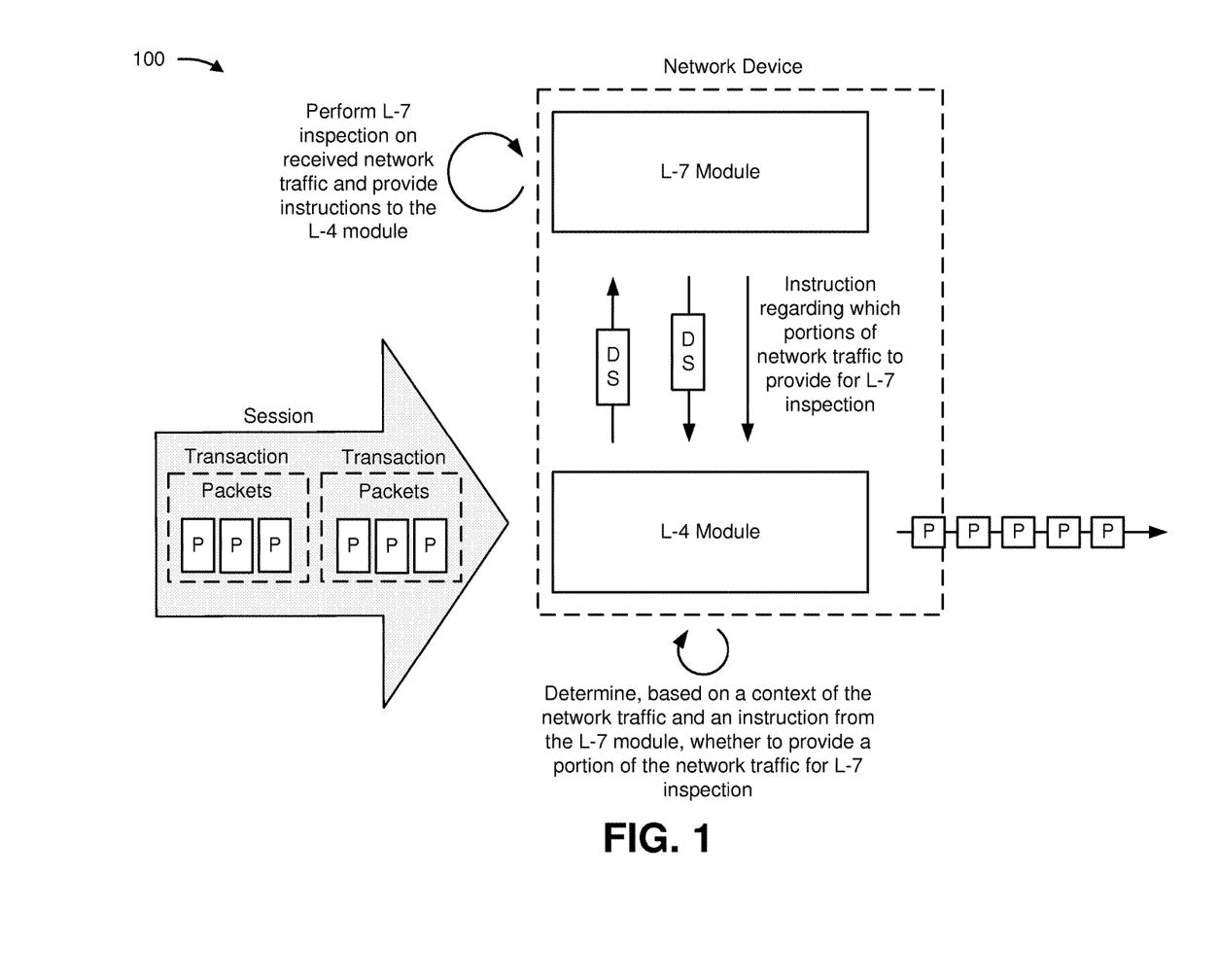
FIG. 1 is a diagram of an overview of an example implementation described herein.

FIG. 1 is a diagram of an overview of an example implementation 100 described herein. As shown in FIG. 1, a network device may include an L-7 module and an L-4 module. The modules of the network device, described herein, may be implemented in different forms of hardware, firmware, software executing on hardware, or a combination thereof. The network device (e.g., via the L-4 module and/or the L-7 module) may perform one or more functions relating to organizing performance of network services on network traffic, such as inspection services, classification services, or the like. The network device (e.g., via the L-4 module and/or the L-7 module) may perform flow tracking (e.g., via a flow table storing information regarding one or more flows of network traffic), stream tracking (e.g., a transmission control protocol stream tracker), or the like. The L-7 module (e.g., a services processing card (SPC)) may perform L-7 network services, such as an application layer inspection and/or a protocol layer inspection of network traffic. The L-4 module (e.g., a transport layer services module) may perform L-4 network services, such as a transport layer inspection of network traffic. In some implementations, the network device may utilize an L-3 module (e.g., that performs network layer inspection of network traffic), an L-3 module and an L-4 module, or the like.

With regard to FIG. 1, when a network traffic session is initiated, such as based on receiving network traffic including a set of packets, the L-4 module may receive the network traffic and may select a first portion of the network traffic for an initial L-7 inspection. The L-4 module may assemble a data stream (e.g., "DS") that includes the first portion of the network traffic, and may provide the data stream to the L-7 module. In some implementations, the first portion of the network traffic may be forwarded to the L-7 module, copied to the L-7 module, or the like.

The L-7 module may perform L-7 inspection (e.g., an application layer inspection) on the first portion of the network traffic. The L-7 module may classify the first portion of the network traffic and/or determine contextual information regarding the network traffic. For example, the L-7 module may determine that the network traffic is associated with a streaming video service, an educational resource, or the like. In another example, the L-7 module may determine that the network traffic includes header data and payload data. In another example, the L-7 module may determine that the network traffic includes a text stream that is ended by a delimiter. In another example, the L-7 module may determine whether a security issue (e.g., a malicious file) is included in the first portion of network traffic.

The network device (e.g., the L-7 module) may generate an instruction associated with determining whether additional network traffic received by the network device (e.g., a second portion of network traffic) is to be sent to the L-7 module for upper layer inspection or provided to a destination endpoint device without upper layer inspection. For example, the network device (e.g., the L-7 module) may determine that a second portion of network traffic (e.g., a remainder of the network traffic of a streaming video) may be offloaded from L-7 inspection. In another example, the L-7 module may determine that, for the second portion of the network traffic, until a delimiter is detected, the network traffic may be offloaded from L-7 inspection. The L-7 module may provide the instruction to the L-4 module and may provide the data stream to the L-4 module (e.g., to be provided toward a destination endpoint device).

With regard to FIG. 1, the L-4 module may receive additional network traffic (e.g., additional packets associated with the same transaction as the first portion of the network traffic, another transaction, or the like). The L-4 module may perform lower layer inspection (e.g., which may include flow reassembly, looking for a byte value, performing a pattern recognition, performing a delimiter recognition, or the like) based on the instruction. If the L-4 module does not determine that a trigger associated with the instruction is satisfied (e.g., a delimiter is not detected, a quantity of bytes has not elapsed, a context has not changed, etc.), the L-4 module may facilitate offloading by omitting the second portion of network traffic from upper layer inspection. If the L-4 module determines that the trigger associated with the instruction is satisfied, the L-4 module may determine that the network traffic is a third portion of network traffic, may select the third portion of network traffic for upper layer inspection, and may resume sending a data stream associated with the third portion of the network traffic to the L-7 module.

In this way, a network device may improve network performance by offloading some network services to an L-4 module as compared with performing network services exclusively using an L-7 module.

Figure 2:
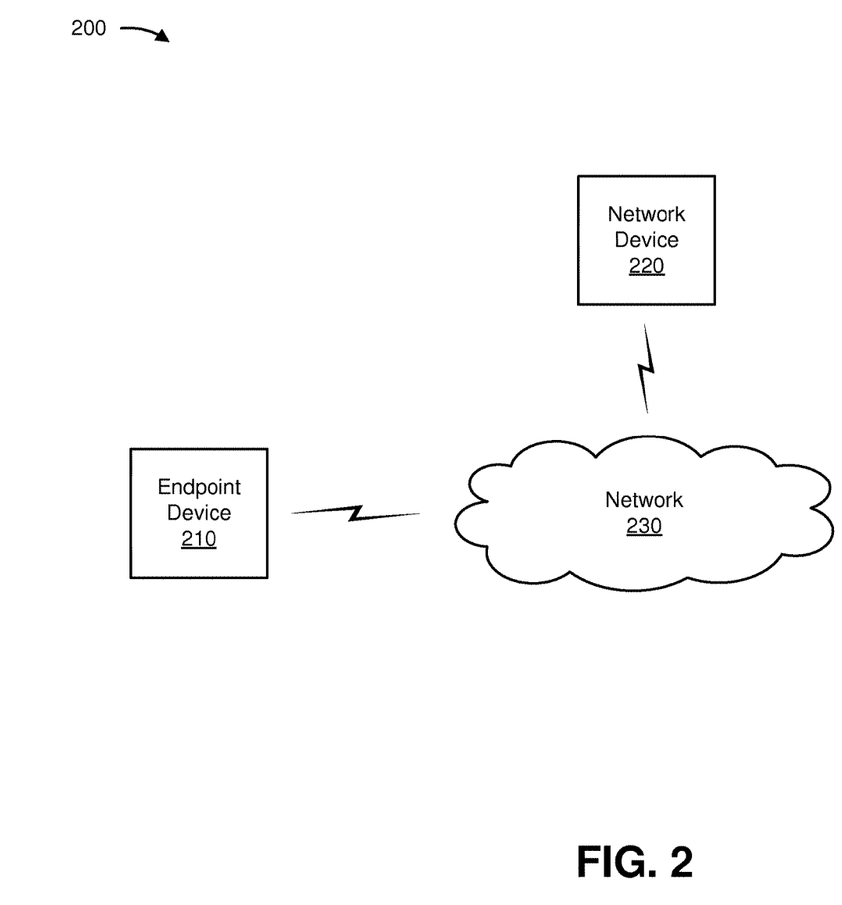
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an endpoint device 210, a network device 220, and a network 230. Devices of environment 200 may interconnect via wired connections, wireless connections, or a combination of wired and wireless connections.

Endpoint device 210 may include one or more devices associated with providing and/or receiving network traffic. For example, endpoint device 210 may include a user device, a server device, or another device that can be a source or a destination of network traffic. In some implementations, endpoint device 210 may provide network traffic via a session, such as a TCP session. For example, a first endpoint device 210 may transmit network traffic to a second endpoint device 210 via a TCP session that includes a set of network traffic transactions. A transaction may include a particular file being transmitted via a session, such as an audio video file, a video file, a multimedia file, a database file, or the like.

Network device 220 may include one or more devices (e.g., one or more traffic transfer devices) capable of processing and/or transferring traffic between endpoint devices 210. For example, network device 220 may include a firewall, a router, a gateway, a switch, a hub, a bridge, a forward proxy, a reverse proxy, a server (e.g., a proxy server), a security device, an intrusion detection device, a load balancer, or a similar device. In some implementations, network device 220 may receive network traffic via a network tap, via inline network traffic receipt, or the like. In some implementations, network device 220 may include a set of common form-factor module (CFM) cards, such as a services processing card (SPC), a network processing card (NPC), or the like. In some implementations, network device 220 may include specialized silicon configured to facilitate services offloading, TCP stream tracking, or the like.

In some implementations, network device 220 may include an L-7 module for performing an L-7 inspection. For example, network device 220 may include an L-7 module that performs L-7 services, such as an application identification (AppID) service, an intrusion prevention system (IPS) service, a universal resource locator (URL) filtering service, a content filtering service, a content inspection service, a payload inspection service, an anti-virus service, an anti-malware service, or the like. In some implementations, network device 220 may include an L-4 module for performing L-4 inspection. For example, network device 220 may include an L-4 module that performs L-4 services. In some implementations, network device 220 may include a decision module for inspecting network traffic to determine which portions of the network traffic to provide to the L-7 module for L-7 inspection or to the L-4 module for L-4 inspection.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
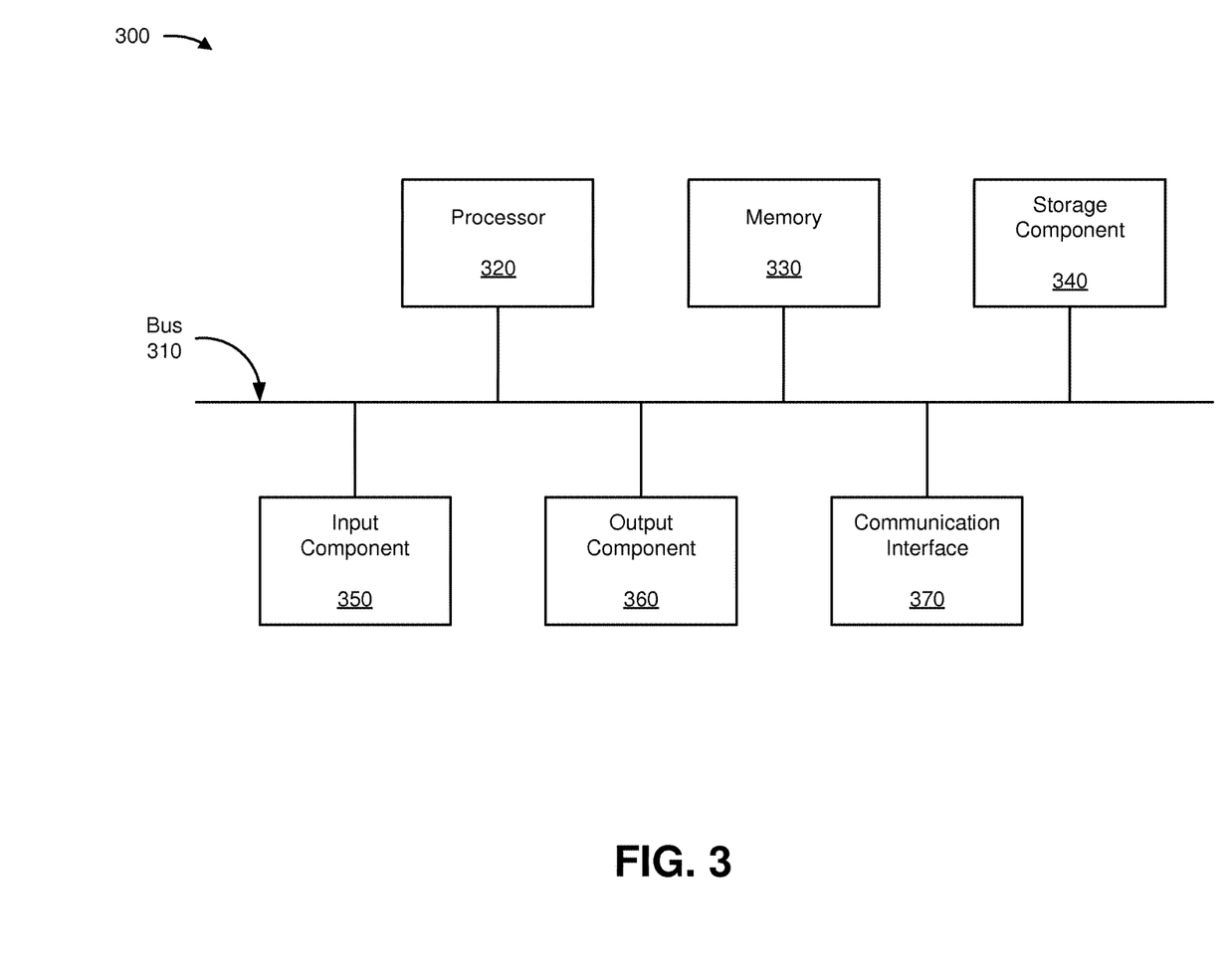
FIG. 3 is a diagram of example components of one or more devices of FIG. 2.

FIG. 3 is a diagram of example components of a device 300. Device 300 may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
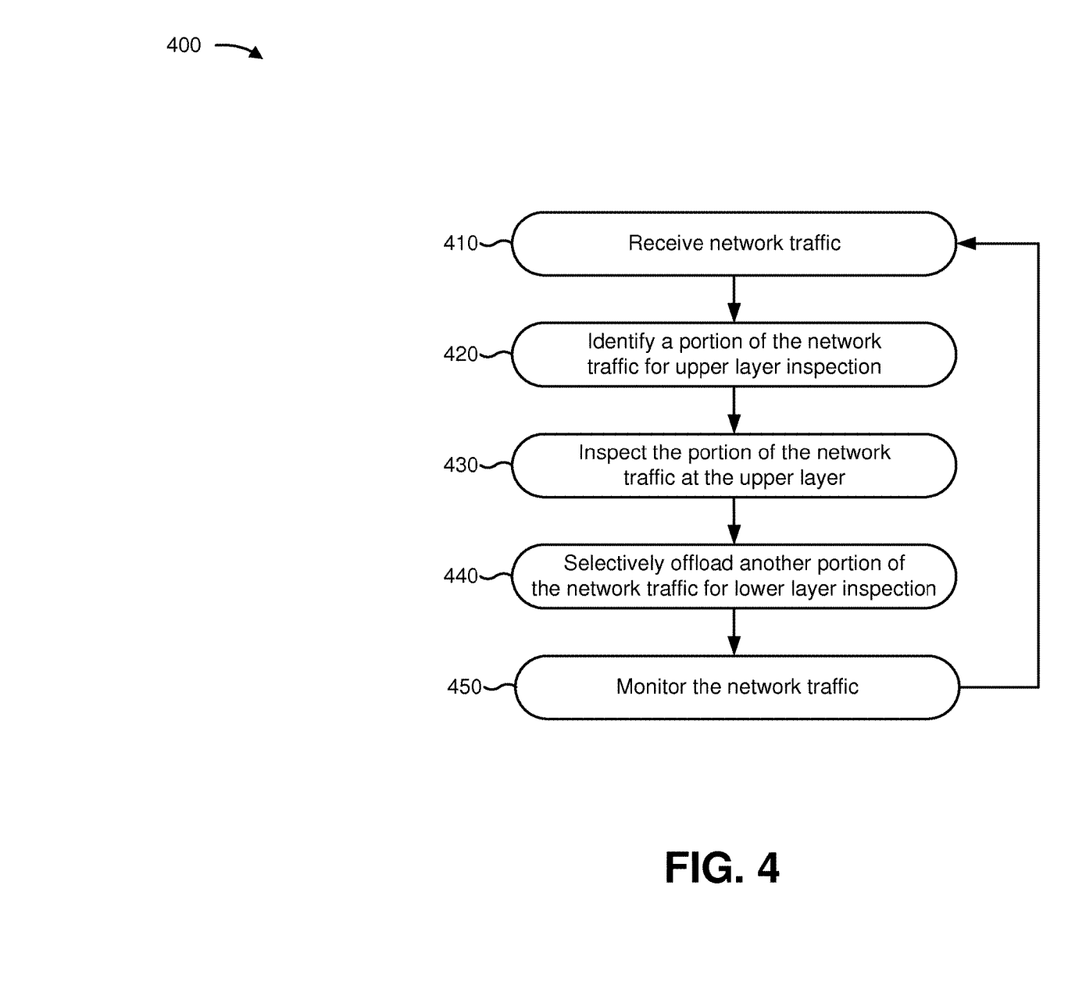
FIG. 4 is a flow chart of an example process for services offloading from an upper layer module to a lower layer module.

FIG. 4 is a flow chart of an example process 400 for selective services offloading from an upper layer module to a lower layer module. In some implementations, one or more process blocks of FIG. 4 may be performed by network device 220. Additionally, or alternatively, one or more process blocks of FIG. 4 may be performed by another device or a set of devices separate from or including network device 220, such as endpoint device 210 or the like.

As shown in FIG. 4, process 400 may include receiving network traffic (block 410). For example, network device 220 may receive network traffic from endpoint device 210.

In some implementations, network device 220 may utilize a network tap to receive the network traffic. For example, network device 220 may receive a copy of one or more packets directed from a first endpoint device 210 to a second endpoint device 210. Additionally, or alternatively, network device 220 may receive network traffic inline. For example, network device 220 may receive network traffic from first endpoint device 210 for routing to second endpoint device 210. In some implementations, network device 220 may receive the network traffic via a particular protocol, such as a transaction based protocol, a non-transaction based protocol, or the like. For example, network device 220 may receive particular network traffic associated with Internet protocol (IP), transmission control protocol (TCP), user datagram protocol (UDP), general packet radio service (GPRS) tunneling protocol (GTP), general routing encapsulation (GRE), or the like.

As further shown in FIG. 4, process 400 may include identifying a portion of the network traffic for upper layer inspection (block 420). For example, network device 220 may identify the portion of the network traffic on which L-7 inspection (e.g., application level inspection) is to be performed. In some implementations, network device 220 may identify the portion of network traffic based on flow information. For example, network device 220 may determine that a packet is associated with a particular flow that is not selected for offloading to a lower layer (e.g., L-4) module for lower layer (e.g., L-4) inspection, and may select the packet for upper layer (e.g., L-7) inspection. In this case, network device 220 may utilize a flow table storing information identifying flows to determine whether the packet is intended to be offloaded to the lower layer (e.g., L-4) module.

In some implementations, network device 220 may identify an initial portion of the network traffic for upper layer inspection. For example, when a transaction (e.g., a TCP transaction) is detected, network device 220 may select an initial portion of network traffic associated with the transaction for classification. Classification may refer to a type of inspection. For example, network device 220 may inspect a URL associated with network traffic and determine that the network traffic is associated with an educational resource, a streaming video service, or the like.

Additionally, or alternatively, network device 220 may identify another portion of the network traffic for upper layer inspection. For example, after performing upper layer inspection on a first portion of network traffic and offloading a second portion of the network traffic, network device 220 may monitor the network traffic and determine that a context of a portion of the network traffic has changed, may detect a trigger associated with the network traffic, such as determining that an instruction associated with the network traffic is satisfied, or the like. Further to the example, network device 220 may select a third portion of the network traffic (e.g., a portion of the network traffic for which the context has changed and/or altered from a context of the first portion of the network traffic and/or the second portion of the network traffic), and may cause the third portion of the network traffic to be provided for upper layer inspection.

Network device 220 may identify the portion of the network traffic based on contextual information, in some implementations. For example, network device 220 may perform a lower layer inspection on the network traffic and determine that the traffic is a particular type of traffic that matches an instruction indicating that the particular type of traffic is to be provided for upper layer inspection. Alternatively, network device 220 may determine that the traffic is another particular type of traffic that matches another instruction indicating that the particular type of traffic is to be omitted from upper layer inspection (e.g., offloaded) and provided toward a destination endpoint device 210, as described herein.

Network device 220 may identify the portion of the network traffic for upper layer inspection based on a type of the network traffic, in some implementations. For example, for some traffic, data for which upper layer (e.g., L-7) inspection is utilized may occur in a header of the network traffic. In this case, network device 220 may identify packets of the network traffic corresponding to the header for upper layer (e.g., L-7) inspection (e.g., network device 220 may determine that network traffic being associated with header information satisfies a trigger of when to provide the network traffic for upper layer inspection). As an example, an audio-video file, an audio-video stream, a database backup, or the like may include header information that network device 220 may identify for upper layer (e.g., L-7) inspection based on the type of network traffic. Additionally, or alternatively, other types of network traffic may also include a first region of data that is appropriate for upper layer (e.g., L-7) inspection and a second region of data for which upper layer (e.g., L-7) inspection may fail to provide useful information. In this case, network device 220 may select one or more packets associated with the first region of data that is appropriate for upper layer (e.g., L-7) inspection. Additionally, or alternatively, network device 220 may determine that a first portion of network traffic is able to be parsed and a second portion of network traffic is not able to be parsed. In this case, network device 220 may select the first portion of network traffic for upper layer (e.g., L-7) inspection and the second portion of network traffic for lower layer (e.g., L-4) inspection.

Additionally, or alternatively, network device 220 may select a portion of network traffic from network traffic based on a type of packet. For example, when network device 220 determines that a set of packets are session control packets (e.g., a synchronization (SYN) packet, a reset (RST) packet, a finish (FIN) packet, or the like), network device 220 may select the set of packets for upper layer (e.g., L-7) inspection. Additionally, or alternatively, network device 220 may determine that a TCP stream cannot be reconstructed (e.g., as a result of out of order packet delivery beyond a re-ordering threshold), and may select packets associated therewith for upper layer (e.g., L-7) inspection.

Network device 220 may identify the portion of network traffic for upper layer inspection based on a policy (e.g., a set of instructions), in some implementations. For example, network device 220 may include a services policy that identifies information to be inspected at the upper layer (e.g., L-7) level on network traffic, services to be performed on network traffic (e.g., that may require performing upper layer (e.g., L-7) inspection on particular portions of the network traffic), or the like. In this case, network device 220 may identify a particular portion of the network traffic that satisfies a requirement of the services policy.

Network device 220 may identify the portion of network traffic for upper layer inspection based on feedback from another upper layer inspection and/or lower layer inspection, in some implementations. For example, network device 220 may perform upper layer (e.g., L-7) inspection and/or lower layer (e.g., L-4) inspection on some network traffic, and may utilize results of the upper layer (e.g., L-7) inspection and/or the lower layer (e.g., L-4) inspection to determine whether to perform upper layer (e.g., L-7) inspection on other network traffic. Further to the example, when a security issue is not detected in a first portion of network traffic, network device 220 may omit a second portion of the network traffic from upper layer (e.g., L-7) inspection. Additionally, or alternatively, when the first portion of the network traffic is determined to include a security issue, network device 220 may select the second portion of network traffic for upper layer (e.g., L-7) inspection. In some implementations, when performing a lower layer (e.g., L-4) inspection on the first portion of network traffic, network device 220 may generate metadata indicating an end to a transaction, a change of state for the lower layer (e.g., L-4) inspection, or the like, and may determine to perform upper layer (e.g., L-7) inspection on a next quantity of packets of the network traffic based on the metadata.

As further shown in FIG. 4, process 400 may include inspecting the portion of the network traffic at the upper layer (block 430). For example, network device 220 may cause the portion of the network traffic to be inspected at the upper layer (e.g., L-7). In some implementations, network device 220 may perform a particular service when performing upper layer (e.g., L-7) inspection. For example, network device 220 may perform a classification service (e.g., identifying an application associated with the portion of the network traffic), a reporting service (e.g., providing a notification regarding an application associated with the portion of the network traffic), a policy service (e.g., applying a quality of service policy, a network management policy, or the like based on an application associated with the portion of the network traffic), a security service (e.g., preventing a download of a malicious file, providing a firewall, etc.), or the like. Additionally, or alternatively, network device 220 may determine whether a security issue is included in the portion of the network traffic, such as a malicious file, a script, a Trojan horse, or the like. For example, network device 220 may determine that the portion of the network traffic is associated with a known Trojan horse program, and may provide one or more alerts regarding the portion of the network traffic.

In some implementations, network device 220 may inspect the portion of the network traffic at the lower layer (e.g., L-4) after inspecting the portion of the network traffic at the upper layer (e.g., L-7). For example, after performing upper layer (e.g., L-7) inspection of the portion of network traffic, network device 220 may forward the same portion of the network traffic, copy the same portion of the network traffic, or the like from an upper layer (e.g., L-7) module to a lower layer (e.g., L-4) module to perform lower layer (e.g., L-4) inspection on the same portion of the network traffic.

In some implementations, network device 220 may update a flow table based on performing upper layer (e.g., L-7) inspection. For example, after determining that the portion of network traffic is not associated with a security issue, network device 220 may update a flow table to indicate that a flow associated with the network traffic is to be inspected at the lower layer (e.g., L-4) for a remainder of a transaction associated with the flow. In this case, network device 220 may forward packets to an NPC associated with lower layer (e.g., L-4) inspection based on updating the flow table.

In some implementations, network device 220 may cause other network traffic to be inspected when performing upper layer inspection on the portion of network traffic. For example, as a result of a time difference between an instruction to offload network traffic from an application layer services module to a transport layer services module, a set of packets may queue at the application layer services module. In this case, network device 220 may cause the set of packets to be forwarded from the application layer services module to the transport layer services module for lower layer (e.g., L-4) inspection by the transport layer services module. Additionally, or alternatively, when packets are incorrectly forwarded to the transport layer services module, network device 220 may cause the packets to be forwarded from the transport layer services module to the application layer services module for inspection at the upper layer (e.g., L-7).

In some implementations, network device 220 may generate an instruction relating to determining whether to offload another portion of network traffic. For example, network device 220 may identify an offloading trigger associated with the network traffic based on performing the upper layer inspection. The offloading trigger may refer to a condition upon which network traffic is offloaded from upper layer inspection or provided for upper layer inspection. For example, the offloading trigger may relate to a quantity of bytes having elapsed. In this case, network device 220 may perform lower layer inspection on the network traffic to determine whether the quantity of bytes have elapsed and may offload the network traffic until the quantity of bytes have elapsed. In another example, the offloading trigger may relate to an end of a transaction, an end of a sub-transaction, an end of a message text, an end of a message binary, a detection of a delimiter that indicates an end of a record, message, or the like, a change to a context (e.g., a change to a source of the network traffic, a change to a destination of the network traffic, a change to a particular application associated with the network traffic, a change to a quantity of network traffic, etc.), or the like.

Additionally, or alternatively, network device 220 may determine one or more conditions upon which network traffic, that is being selectively offloaded to an L-4 module, is to be provided to the L-7 module for upper layer inspection (e.g., a condition upon which offloading of the second portion of the network traffic is to end and a third portion of the network traffic is to be provided for upper layer inspection). In some implementations, the offloading trigger may relate to a session. For example, network device 220 may determine that a second portion of network traffic is to be offloaded while the second portion of the network traffic is associated with the same session as the first portion of the network traffic. Further to the example, network device 220 may classify the network traffic as a third portion of the network traffic when a new session (e.g., a new TCP session) is detected, and may provide the third portion of the network traffic for upper layer inspection. Additionally, or alternatively, the offloading trigger may relate to a transaction. For example, network device 220 may determine that the second portion of network traffic is to be offloaded until a new transaction (e.g., a new request and response associated with a first endpoint device 210 and a second endpoint device 210, respectively) is detected.

Additionally, or alternatively, the offloading trigger may relate to a context of the network traffic, determined based on performing upper layer inspection. For example, network device 220 may determine to perform offloading for a period of time, for a quantity of bytes, or the like. Additionally, or alternatively, network device 220 may determine to perform offloading until the network traffic does not match a network traffic profile. For example, network device 220 may determine that offloading is to occur unless the quantity of network traffic being received by a particular endpoint device 210 satisfies a threshold (e.g., which may indicate that the network traffic is no longer associated with the network traffic for which upper layer inspection was performed).

As further shown in FIG. 4, process 400 may include selectively offloading another portion of the network traffic for lower layer inspection (block 440). For example, network device 220 may cause another portion of the network traffic to be inspected at the lower layer (e.g., L-4). In some implementations, network device 220 may offload the other portion of network traffic for a particular duration. For example, network device 220 may, after performing upper layer (e.g., L-7) inspection on a portion of network traffic associated with a particular flow, offload the payload of network traffic associated the particular. Additionally, or alternatively, network device 220 may offload network traffic for a duration of a quantity of bytes, a period of time, until a security issue is detected during lower layer (e.g., L-4) inspection, until a determination is made as to whether an exploit is detected, or the like.

In some implementations, network device 220 may offload the network traffic to an L-4 module until a trigger is detected. For example network device 220 may offload the network traffic until a new session is detected, a net transaction is detected, a context of the network traffic is altered (e.g., a bit rate satisfies a threshold, a type of network traffic is altered, etc.), or the like.

In some implementations, after performing upper layer (e.g., L-7) inspection on the portion of network traffic, network device 220 may perform lower layer (e.g., L-4) inspection on the remaining portion of the network traffic of the flow. For example, when network device 220 receives a movie file for inspection, network device 220 may perform upper layer (e.g., L-7) inspection on a header of the movie file and lower layer (e.g., L-4) inspection on the remainder of the movie file.

In some implementations, network device 220 may generate feedback based on performing the lower layer (e.g., L-4) inspection. For example, an NPC of network device 220 may generate metadata, associated with the network traffic, that may be provided to a decision module of network device 220 to control inspection of other network traffic by network device 220. Further to the example, the metadata may indicate whether to perform upper layer (e.g., L-7) inspection on other network traffic, lower layer (e.g., L-4) inspection on other network traffic, or the like. Additionally, or alternatively, network device 220 may update a state associated with the lower layer (e.g., L-4) inspection. For example, network device 220 may update the state for the flow that includes the network traffic to indicate that the flow has ended, thereby causing upper layer (e.g., L-7) inspection to be resumed on other network traffic, thereby maintaining synchronization between an upper layer (e.g., L-7) module and an lower layer (e.g., L-4) module.

In some implementations, network device 220 may determine a second portion of the network traffic for selective offloading to lower layer inspection and a third portion of the network traffic for upper layer inspection. For example, network device 220 may determine contextual information regarding the network traffic based on performing the upper layer inspection, and may select the second portion and the third portion based on the contextual information. The contextual information may include classifying the network traffic into a particular type, such as education traffic, streaming video traffic, database backup traffic or the like. Additionally, or alternatively, the contextual information may be associated with a security assessment of the network traffic. Further to the example, network device 220 may determine selective offloading to occur until a trigger is detected by the L-4 module of network device 220. In this case, network traffic that offloaded is termed the second portion of the network traffic. When the trigger is detected by the L-4 module of network device 220, network device 220 may resume upper layer inspection. In this case, network traffic that is directed for upper layer inspection is termed the third portion of the network traffic.

As an example, network device 220 may receive network traffic, and may classify the network traffic as being associated with streaming video based on performing upper layer inspection on a first portion of the network traffic. Network device 220 may determine to offload a second portion of the network traffic until a transaction associated with the streaming video is completed. When network device 220 determines that the transaction associated with the streaming video is completed, network device 220 may determine that a third portion of the network traffic and/or a first portion of other network traffic, is to be directed for upper layer (e.g., L-7) inspection.

As further shown in FIG. 4, process 400 may include monitoring the network traffic (block 450). For example, network device 220 may monitor additional network traffic to determine whether to inspect the additional network traffic at a lower layer (e.g., L-4) and/or at an upper layer (e.g., L-7). In some implementations, network device 220 may determine a criteria associated with contextual information regarding the network traffic is satisfied, such as a trigger being triggered or the like. For example, network device 220 may determine that a next transaction is detected, a next session is detected, a binary record is detected (e.g., a particular binary set of information), a text record is detected (e.g., a particular ASCII delimiter indicating an end to the text record), a particular quantity of bytes have elapsed, a particular period of time has elapsed, a particular quantity of packets have elapsed, a bit rate has changed, an Internet protocol (IP) address of an endpoint device 210 associated with the network traffic has changed, or the like. In this case, network device 220 may resume upper layer inspection on another portion of the network traffic, other network traffic, or the like, such as by providing the network traffic to an L-7 module for upper layer inspection.

In some implementations, network device 220 may detect that network traffic is associated with another session, another flow, or the like, and may determine whether to perform upper layer (e.g., L-7) inspection on the network traffic. In some implementations, network device 220 may re-enable upper layer (e.g., L-7) inspection when monitoring network traffic and/or receiving network traffic. For example, when network device 220 routes the network traffic to a transport layer services module to perform lower layer (e.g., L-4) inspection and a flow is completed, network device 220 may alter routing of the network traffic to an application layer services module to perform upper layer (e.g., L-7) inspection.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of contextual acceleration by selective services offloading from a Layer 7 module to a Layer 4 module.

Figure 5A:
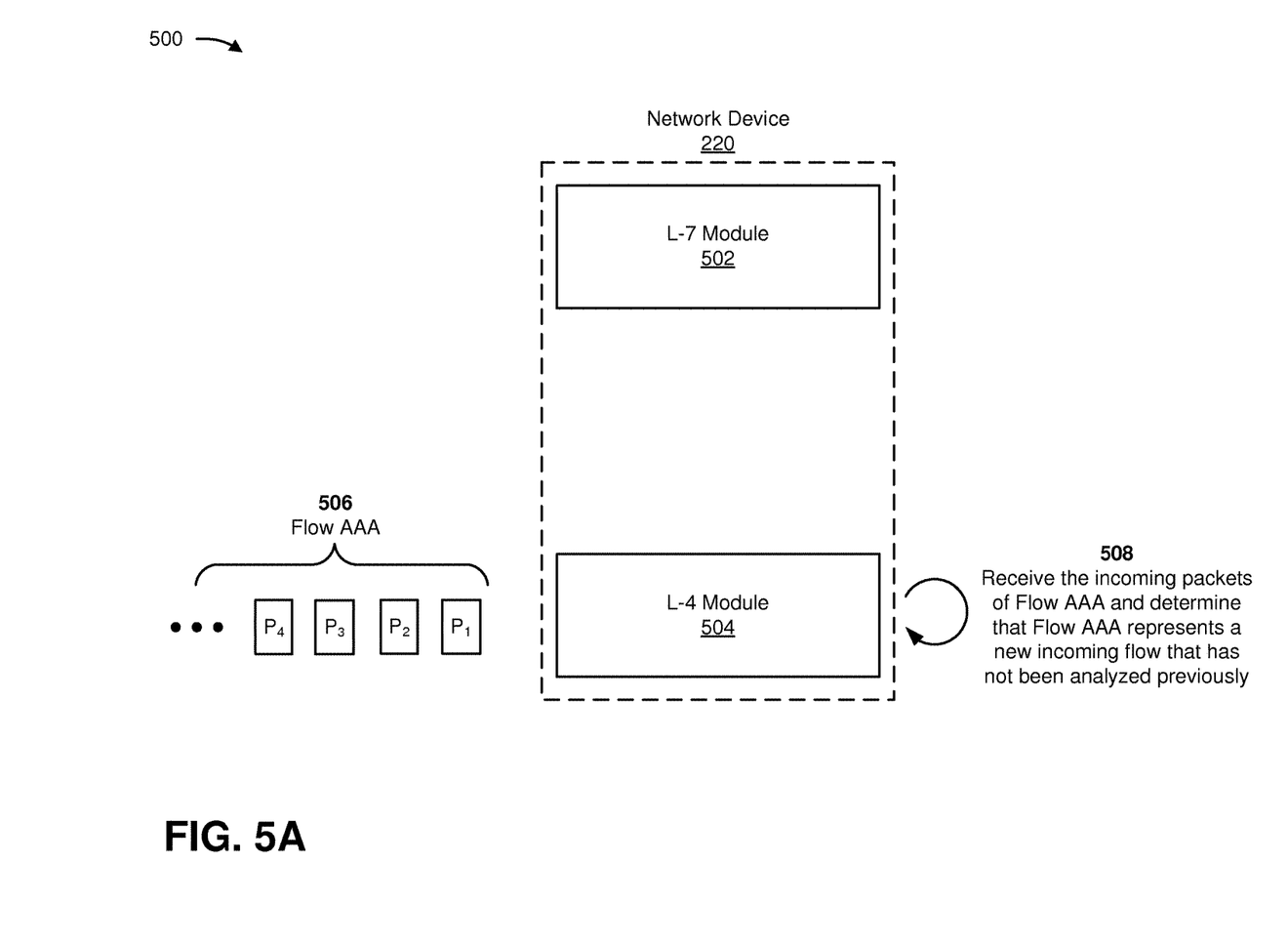
FIGS. 5A-5E are diagrams of an example implementation relating to the example process shown in FIG. 4.

With regard to FIG. 5A, assume that network device 220 is configured inline with a first endpoint device 210 (e.g., associated with providing network traffic) and a second endpoint device 210 (e.g., associated with receiving network traffic) (not shown). As a result, network device 220 receives packets from first endpoint device 210 and routes the packets to second endpoint device 210 (e.g., after inspecting the packets). In another example, network device 220 may receive TCP stream data, encrypted communications data (e.g., secure sockets layer data or the like), proxy data, or the like from first endpoint device 210 to be provided to second endpoint device 210. Network device 220 includes an L-7 module 502 and an L-4 module 504.

As shown in FIG. 5A, and by reference number 506, network device 220 receives a network traffic flow (e.g., "Flow AAA") including one or more packets (e.g., $P_1$, $P_2$, etc.). As shown by reference number 508, network device 220 (e.g., L-4 module 504) determines, based on one or more packets of Flow AAA, that Flow AAA represents a new incoming flow that has not been previously analyzed. For example, network device 220 may compare Flow AAA to a flow table storing information regarding one or more network traffic flows.

Figure 5B:
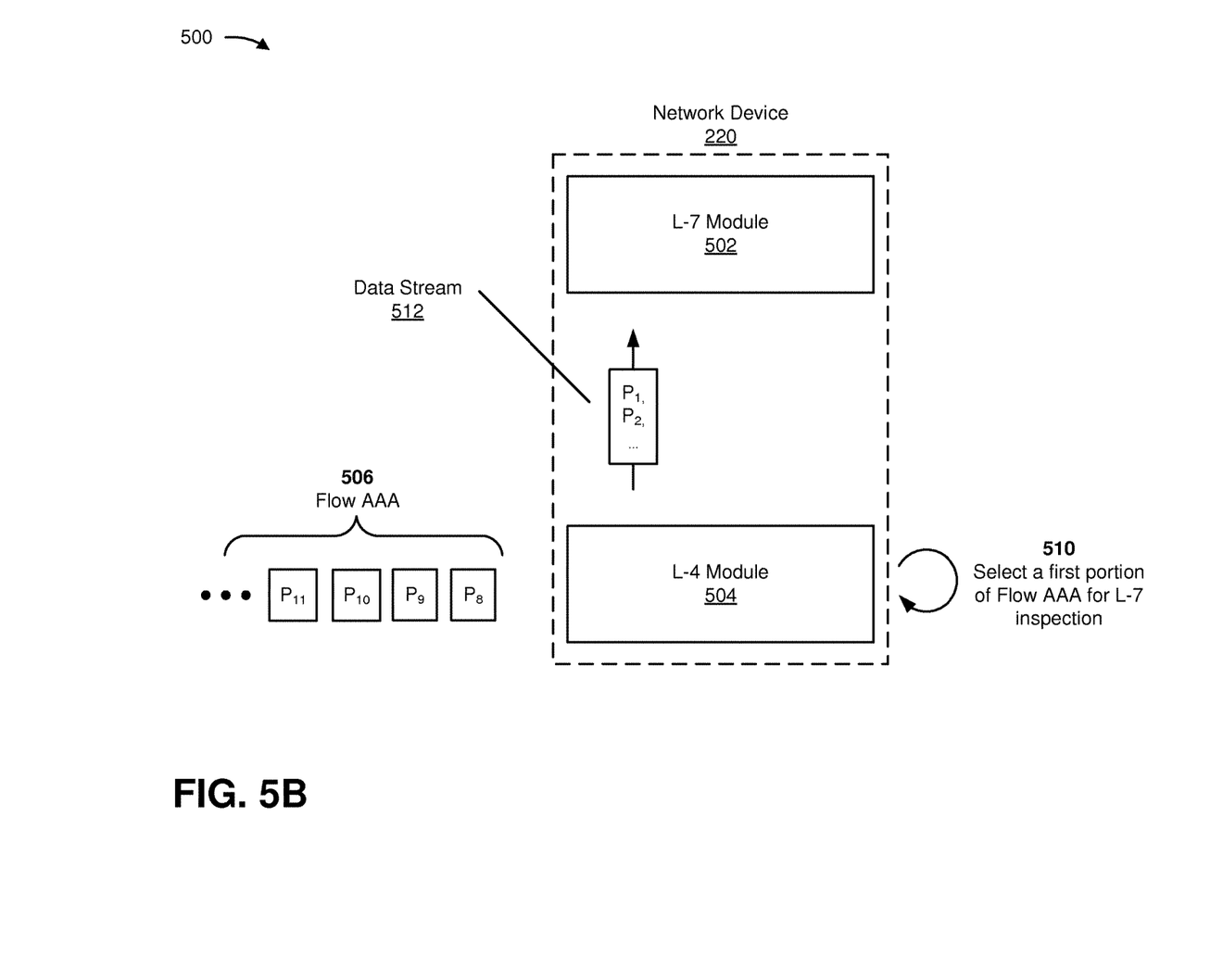

As shown in FIG. 5B, and by reference number 510, network device 220 (e.g., L-4 module 504) selects a first portion of Flow AAA for L-7 inspection. L-4 module 504 assembles data stream 512 (e.g., which includes a set of packets, $P_1$, $P_2$, etc.). L-4 module 504 provides data stream 512 to L-7 module 502 for L-7 inspection.

Figure 5C:
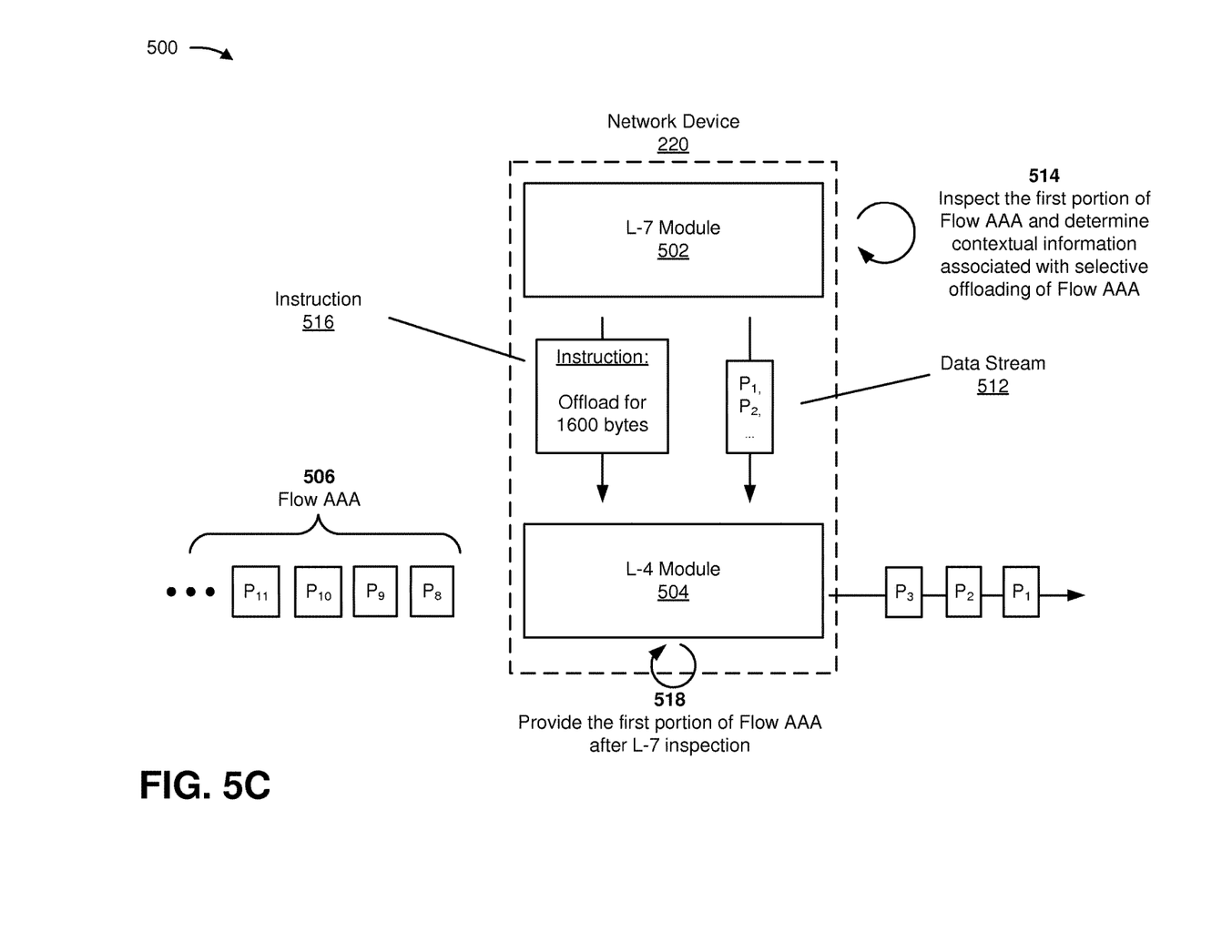

As shown in FIG. 5C, and by reference number 514, network device 220 (e.g., L-7 module 502) inspects the first portion of Flow AAA (e.g., data stream 512) and determines contextual information associated with selective offloading of Flow AAA. For example, L-7 module 502 may determine that Flow AAA is associated with an educational type of webpage, and may determine that this type of webpage may be offloaded for a particular quantity of bytes before re-inspecting network traffic associated therewith. As shown by reference number 516, L-7 module 502 provides instruction 516 to L-4 module 504. Instruction 516 indicates that L-4 module 504 is to facilitate offloading for 1600 bytes (e.g., a configurable quantity determined by L-7 module 502). L-7 module 502 provides data stream 512 to L-4 module 504 and, as shown by reference number 518, L-4 module 504 provides the first portion of Flow AAA (e.g., data stream 512) toward second endpoint device 210 for receipt.

Figure 5D:
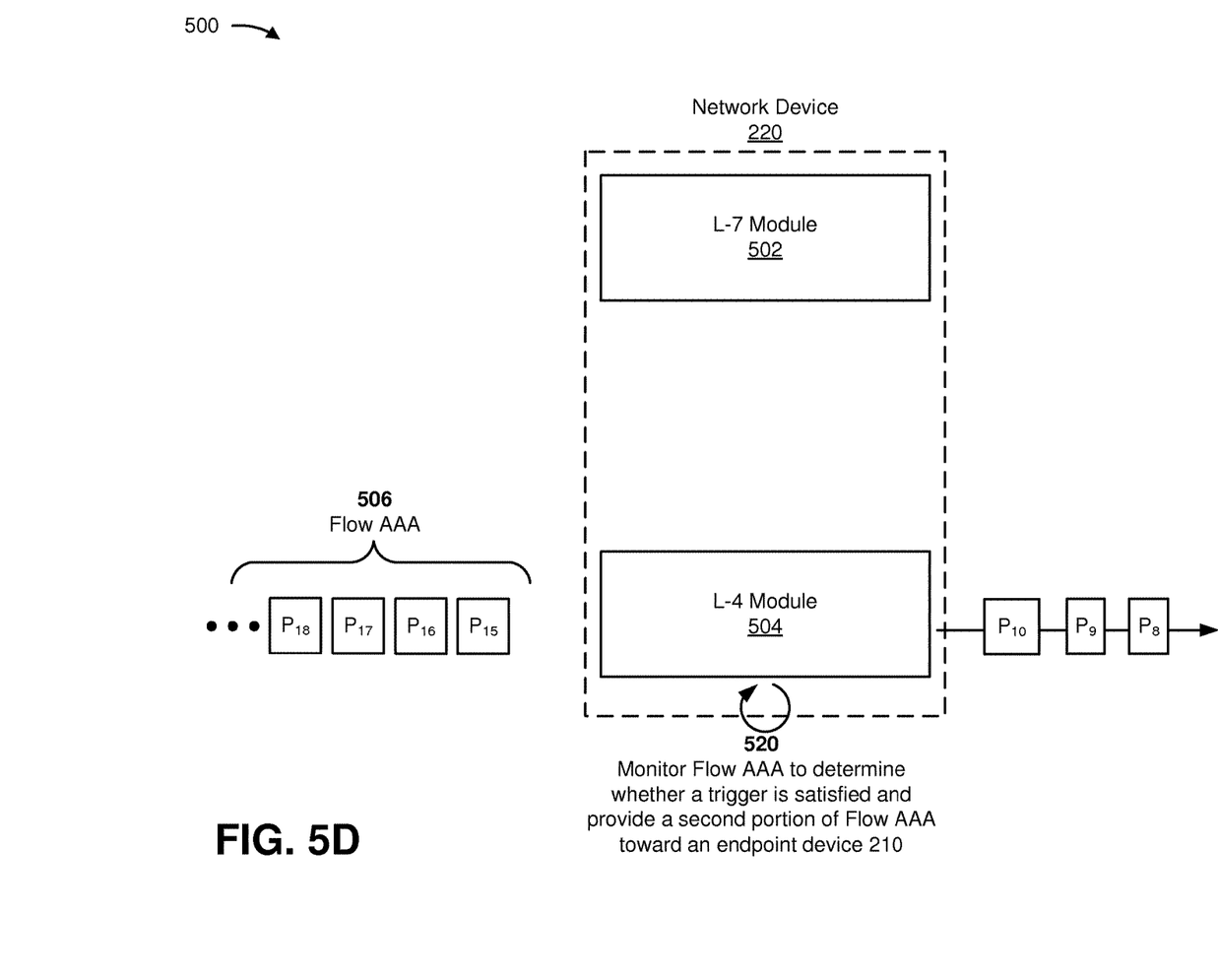

As shown in FIG. 5D, network device 220 (e.g., L-4 module 504) receives additional packets of Flow AAA. As shown by reference number 520, L-4 module monitors Flow AAA (e.g., a second portion of network traffic associated with Flow AAA) to determine whether 1600 bytes have elapsed and, based on 1600 bytes having not elapsed for Flow AAA, provides the second portion of network traffic toward second endpoint device 210 for receipt.

Figure 5E:
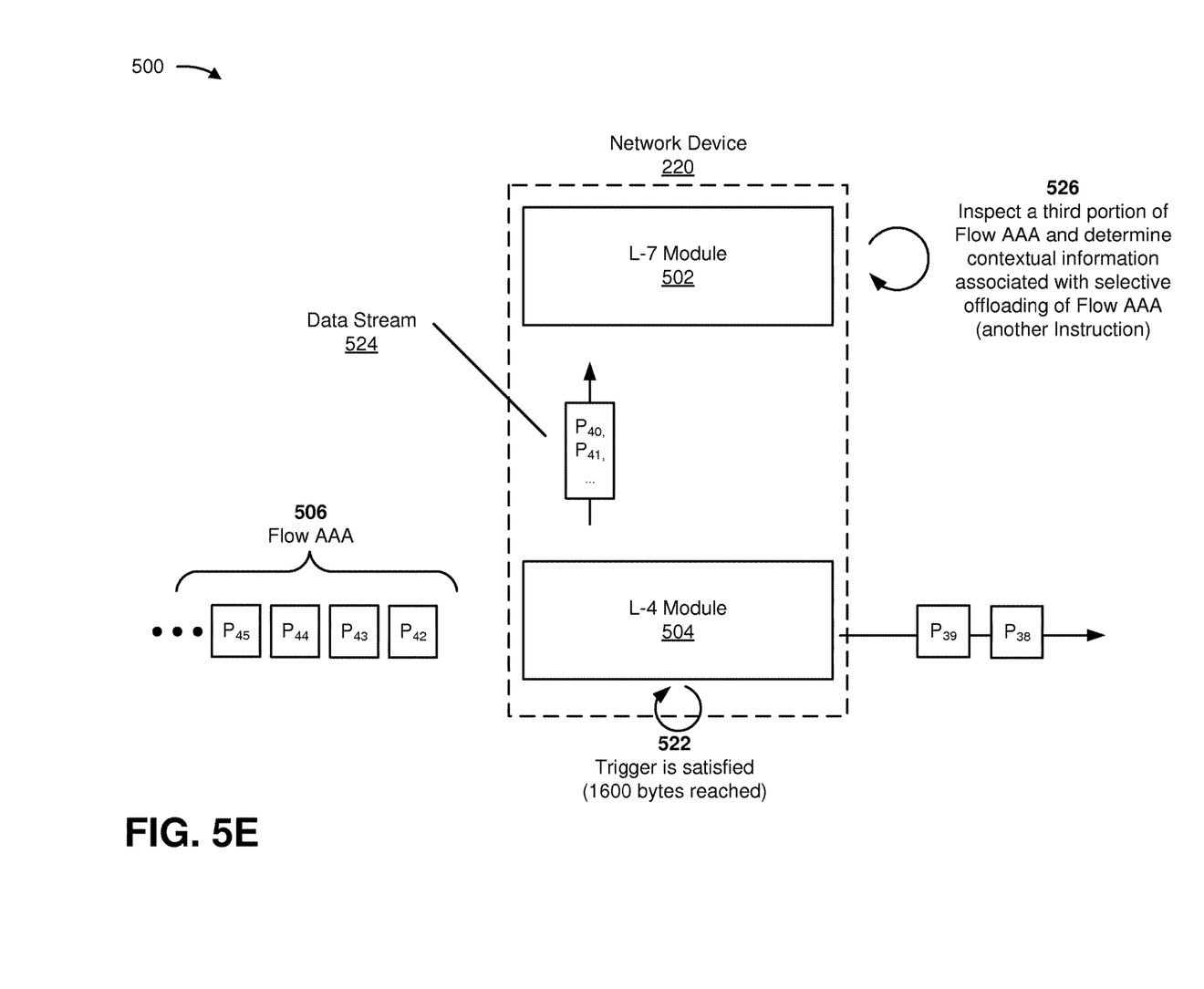

As shown in FIG. 5E, network device 220 (e.g., L-4 module 504) receives additional packets of Flow AAA. As shown by reference number 522, L-4 module 504 determines that 1600 bytes have elapsed and assembles a third portion of network traffic of Flow AAA into data stream 524 (e.g., packets $P_{40}$, $P_{41}$, etc.). Data stream 524 is provided to L-7 module 502 for L-7 inspection. As shown by reference number 526, L-7 module 502 inspects a third portion of Flow AAA and determines contextual information associated with selective offloading of Flow AAA (e.g., another instruction, such as an instruction relating to an end of a transaction, an end of a sub-transaction, an end of a message, etc.). Network device 220 may continue to receive network traffic of Flow AAA, of another network traffic flow, or the like, and may continue to determine whether to provide portions of the network traffic to L-7 module 502 based on instructions provided to L-4 module 504 by L-7 module 502 based on a context of the network traffic.

As indicated above, FIGS. 5A-5E are provided merely as an example. Other examples are possible and may differ from what was described with regard to FIGS. 5A-5E.

In this way, network device 220 may offload portions of network traffic from L-7 inspection based on a context of the portions of network traffic (e.g., a classification of the network traffic) and/or an instruction relating to the context, thereby facilitating improved network performance, increased throughput, and/or decreased latency relative to network device 220 performing L-7 inspection exclusively or offloading L-7 inspection only based on a stream of network traffic. Moreover, by selectively engaging in L-4 inspection and/or L-7 inspection, network device 220 may prevent security issues associated with only utilizing fixed services offloading (e.g., a security issue that may be embedded in a flow after a point at which fixed services offloading is utilized on the flow).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, network traffic;
identifying, by the device, a first portion of the network traffic for an application layer inspection;
performing, by the device, the application layer inspection on the first portion of the network traffic based on identifying the first portion of the network traffic;
determining, by the device, a context regarding the network traffic based on the application layer inspection on the first portion of the network traffic;
selectively offloading, by the device, a second portion of the network traffic for transport layer inspection without the application layer inspection based on whether the context regarding the network traffic has changed for the second portion of the network traffic;
providing, by the device, the second portion of the network traffic to a destination without causing the second portion of the network traffic to be provided for application layer inspection;
determining, by the device, that a trigger associated with the network traffic is satisfied;
identifying, by the device, a third portion of the network traffic based on determining that the trigger is satisfied; and
causing, by the device, the third portion of the network traffic to be provided for application layer inspection based on identifying the third portion of the network traffic.

2. The method of claim 1, further comprising:
generating one or more instructions for selectively offloading the second portion of the network traffic based on the context associated with the network traffic; and
where selectively offloading the second portion of the network traffic comprises:
selectively offloading the second portion of the network traffic based on the one or more instructions.

3. The method of claim 2, where the context associated with the network traffic is associated with at least one of:
a type of the network traffic,
a source of the network traffic,
a destination of the network traffic,
a quantity of the network traffic,
a session associated with the network traffic,
a transaction associated with the network traffic, or
a sub-transaction associated with the network traffic.

4. The method of claim 2, where selectively offloading the second portion of the network traffic comprises:
monitoring the network traffic to determine, based on the one or more instructions, whether to cause the third portion of the network traffic to be provided for the application layer inspection.

5. The method of claim 1, where the application layer inspection is an Open Systems Interconnection (OSI) Layer 7 inspection.

6. The method of claim 1, where the transport layer inspection is an Open Systems Interconnection (OSI) Layer 4 inspection.

7. The method of claim 1, further comprising:
determining that the first portion of the network traffic is not malicious based on performing the application layer inspection; and
where selectively offloading the second portion of the network traffic comprises:
selectively offloading the second portion of the network traffic based on determining that the first portion of the network traffic is not malicious.

8. The method of claim 1, further comprising:
determining that the first portion of the network traffic is associated with a particular application based on performing application layer inspection; and
where selectively offloading the second portion of the network traffic comprises:
selectively offloading the second portion of the network traffic based on determining that the first portion of the network traffic is associated with the particular application,
the second portion of the network traffic being associated with the particular application.

9. The method of claim 1, further comprising:
performing a classification of the first portion of the network traffic based on performing the application layer inspection;
performing a security assessment of the network traffic based on the classification; and
resuming application layer inspection after offloading the second portion of the network traffic for transport layer inspection based on the security assessment.

10. The method of claim 1, where the trigger is associated with at least one of:
a quantity of bytes having elapsed,
an end of a transaction,
an end of a sub-transaction,
an end of a message text,
an end of a message binary, or
a detection of a delimiter.

11. A computer-readable medium storing instructions, the instructions comprising:
one or more instructions that, when executed by one or more processors, cause the one or more processors to:
perform a lower layer inspection on a first portion of network traffic;
cause an upper layer inspection to be performed on the first portion of the network traffic based on the lower layer inspection on the first portion of the network traffic,
the upper layer being higher relative to the lower layer in an Open Systems Interconnection (OSI) model;
determine a trigger regarding network traffic that is to be offloaded from the upper layer inspection based on the upper layer inspection,
the trigger relating to a context for the network traffic that is to be offloaded changing from a context for the first portion of the network traffic;
perform another lower layer inspection on a second portion of the network traffic,
the other lower layer inspection indicating that the trigger is not satisfied for the second portion of the network traffic;
provide the second portion of the network traffic toward a destination without performing another upper layer inspection based on the trigger not being satisfied for the second portion of the network traffic;
determine that the trigger is satisfied for another portion of the network traffic;

identify a third portion of the network traffic as the other portion of the network traffic based on determining that the trigger is satisfied; and cause the third portion of the network traffic to be provided for the upper layer inspection based on identifying the third portion of the network traffic.

12. The computer-readable medium of claim 11, where the one or more instructions, that cause the one or more processors to perform the other lower layer inspection on the second portion of the network traffic, cause the one or more processors to:

determine that a context of the second portion of the network traffic corresponds to the context of the first portion of the network traffic based on the other lower layer inspection; and where the one or more instructions, that cause the one or more processors to provide the second portion of the network traffic toward the destination without performing the other upper layer inspection, cause the one or more instructions to:

provide the second portion of the network traffic toward the destination without performing the other upper layer inspection based on determining that the context of the second portion of the network traffic matches the context of the first portion of the network traffic.

13. The computer-readable medium of claim 11, where the first portion of the network traffic corresponds to header information of a file and the second portion of the network traffic corresponds to payload information of the file.

14. The computer-readable medium of claim 13, where the one or more instructions, when executed by one or more processors, further cause the one or more processors to:

receive the third portion of the network traffic,
the third portion of the network traffic being associated with a same session as the first portion of the network traffic and the second portion of the network traffic;

perform a lower layer inspection on the third portion of the network traffic,
the third portion of the network traffic being determined to be header information of another file based on the lower layer inspection;

where the trigger is determined to be satisfied based on the third portion of the network traffic being determined to be header information of the other file; and where the upper layer inspection is performed on the third portion of the network traffic based on determining that the trigger is satisfied.

15. The computer-readable medium of claim 11, where the one or more instructions, that cause the one or more processors to perform the lower layer inspection, cause the one or more processors to:

forward the first portion of the network traffic to a hardware module to perform the lower layer inspection; and where the one or more instructions, that cause the one or more processors to perform the upper layer inspection, cause the one or more processors to:

forward the first portion of the network traffic to a software module to perform the upper layer inspection.

16. A device, comprising:
a communication interface; and
one or more processors, at least partially implemented in hardware, to:
receive a set of packets;
select a first one or more packets, of the set of packets, for a Layer 7 (L-7) inspection based on a type of network traffic associated with the set of packets;
perform the L-7 inspection on the first one or more packets;

determine a context associated with the first one or more packets based on the L-7 inspection;

offload a second one or more packets, of the set of packets, for a Layer 4 (L-4) inspection without performing the L-7 inspection based on whether a context associated with the second one or more packets changes from the context associated with the first one or more packets, provide the second one or more packets to a destination without causing the second one or more packets to be provided for L-7 inspection;

determine that a trigger associated with the set of packets is satisfied;

identify a third one or more packets, of the set of packets, based on determining that the trigger is satisfied; and cause the third one or more packets, of the set of packets, to be provided for L-7 inspection based on identifying the third one or more packets.

17. The device of claim 16, where the one or more processors, when offloading the second one or more packets, are to:

utilize hardware to perform the L-4 inspection on the second one or more packets.

18. The device of claim 16, where the one or more processors, when offloading the second one or more packets, are to:

perform the L-4 inspection on the second one or more packets;

determine, based on the L-4 inspection, that the second one or more packets are associated with a context corresponding to the context associated with the first one or more packets; and omit the second one or more packets from the L-7 inspection based on determining that the second one or more packets are associated with the context corresponding to the context associated with the first one or more packets.

19. The device of claim 18, where the one or more processors, when omitting the second one or more packets from the L-7 inspection, are to:

perform at least one of:
a data stream assembly of the second one or more packets,
an identification of a traffic flow associated with the second one or more packets,
a pattern recognition on the second one or more packets,
the pattern recognition being associated with an instruction regarding whether to end offloading of the second one or more packets,
a delimiter recognition on the second one or more packets,
the delimiter recognition being associated with the instruction regarding whether to end offloading of the second one or more packets, or
a byte offset detection on the second one or more packets,
the byte offset detection being associated with the instruction regarding whether to end offloading of the second one or more packets.

20. The device of claim 16, where the trigger is associated with at least one of:
a quantity of bytes having elapsed,
an end of a transaction,
an end of a sub-transaction,
an end of a message text,
an end of a message binary, or
a detection of a delimiter.

* * * * *